(12) United States Patent  (10) Patent No.: US 9,169,159 B2
Setliff et al.  (45) Date of Patent: Oct. 27, 2015

(54) CEMENTITIOUS COMPOSITION

(71) Applicants: Jerry Setliff, Corpus Christi, TX (US);
Clinton W Pike, Montgomery, TX (US)

(72) Inventors: Jerry Setliff, Corpus Christi, TX (US);
Clinton W Pike, Montgomery, TX (US)

(73) Assignee: Jerry Setliff, Corpus Christi, TX (US)

( * ) Notice: Subject to any disclaimer, the term of this patent is extended or adjusted under 35 U.S.C. 154(b) by 80 days.

(21) Appl. No.: 14/206,684

(22) Filed: Mar. 12, 2014

(65) Prior Publication Data
US 2014/0275349 A1  Sep. 18, 2014

Related U.S. Application Data

(60) Provisional application No. 61/827,923, filed on May 28, 2013, provisional application No. 61/800,999, filed on Mar. 15, 2013.

(51) Int. Cl.
*C04B 28/28* (2006.01)
*C04B 18/06* (2006.01)
*C04B 18/08* (2006.01)
*C04B 28/02* (2006.01)

(52) U.S. Cl.
CPC .................................... *C04B 28/021* (2013.01)

(58) Field of Classification Search
CPC ...... C04B 28/28; C04B 14/047; C04B 18/06; C04B 18/08; C04B 18/101
See application file for complete search history.

(56) References Cited

U.S. PATENT DOCUMENTS 4,804,297 A  2/1989 Reifsnyder et al.
5,352,288 A  10/1994 Mallow
(Continued)

FOREIGN PATENT DOCUMENTS

CN  1115309 C  7/2003

OTHER PUBLICATIONS

DYNASTONE Generation 2 Acid Resistant Concrete Pipe, Corrosion Resistant Economical, Oct. 2, 2004, brochure only.
(Continued)

*Primary Examiner* — Paul Marcantoni
(74) *Attorney, Agent, or Firm* — The Morris Law Firm, P.C.; Paula D. Morris

(57) ABSTRACT

A hydrated cementitious blend, and method of using same, the blend comprising:
  a dry cementitious blend comprising the following, based on the total weight of the dry cementitious blend:
    aggregate comprising less than 3 wt. % calcium, based on the total weight of the aggregate;
    from about 75 wt. % to 82 wt. % pozzolonic material comprising improved ash comprising particles meeting the ASTM C 989-2010 testing protocol for grade 100 slag quality or higher, the improved ash being selected from the group consisting of fly ash, calcined or uncalcined volcanic ash, rice hull ash, and combinations thereof;
    a catalytically effective quantity of catalyst selected from the group consisting of alkali-containing zeolite, alkali-containing feldspathoid, and combinations thereof; and,
    an amount of water reducing component;
  the hydrated cementitious blend further comprising an amount of water producing a ratio of water to cementitious blend of from about 0.20 to about 0.30 and a slump of 6 or more;
  the hydrated cementitious blend producing a product cement exhibiting a compressive strength of 4000 psi or more after curing for 28 days at 75° F. or more.

28 Claims, 2 Drawing Sheets

(56) References Cited

U.S. PATENT DOCUMENTS

| | | | |
|---|---|---|---|
| 5,387,738 | A | 2/1995 | Beckham et al. |
| 5,494,513 | A | 2/1996 | Fu et al. |
| 5,565,028 | A | 10/1996 | Roy et al. |
| 5,601,643 | A | 2/1997 | Silverstrim et al. |
| 5,624,489 | A | 4/1997 | Fu et al. |
| 5,820,668 | A | 10/1998 | Comrie |
| 6,027,561 | A | 2/2000 | Gruber et al. |
| 6,036,768 | A | 3/2000 | Edlinger et al. |
| 6,342,191 | B1 | 1/2002 | Kepner et al. |
| 6,358,311 | B1 | 3/2002 | Arai et al. |
| 6,409,819 | B1 | 6/2002 | Ko |
| 6,419,738 | B1 | 7/2002 | Classen et al. |
| 6,482,258 | B2 | 11/2002 | Styron |
| 6,494,951 | B1 | 12/2002 | Reddy et al. |
| 6,565,647 | B1 | 5/2003 | Day et al. |
| 6,645,289 | B2 | 11/2003 | Sobolev et al. |
| 6,858,074 | B2 | 2/2005 | Anderson et al. |
| 6,911,494 | B2 | 6/2005 | Yamashita et al. |
| 7,442,248 | B2 | 10/2008 | Timmons |
| 2004/0187740 | A1* | 9/2004 | Timmons ............... C04B 28/18 106/705 |
| 2005/0252420 | A1* | 11/2005 | Timmons ............... C04B 28/021 106/705 |

OTHER PUBLICATIONS

Chiara F. Ferraris, Concrete Mixing Methods and Concrete Mixers: State of the Art, National Institute of Standards and Technology, Mar.-Apr. 2001, pp. 391-399, vol. 106, No. 2.

Mario Collepardi, et al., Influence of Amorphous Colloidal Silica on the Properties of Self-Compacting Concretes, Proceedings of the International Conference "Challenges in concrete Construction—Innovations and Developments in Concrete Materials and Construction" Sep. 2002, pp. 473-483, Dundee, Scotland, UK.

TORFTECH, Energy & Amorphous silica Production from Rice Husk, TORBED* Process Reactor Technology Application Description, Aug. 2002, http://www.torftech.com/pdf/Application%20Description%20-%20Rice%20Hulls.pdf.

QUIKRETE®, Material Safety Data Sheet, Jan. 2002.

Zeoponix, Inc. Zeolite: The Versatile Mineral, 2000, http://www.zeoponix.com/zeolite.htm.

Rugby, How Cement is Made, Mar. 2003, http://www.rmcrugby.co.uk/pages/howcementismade.asp.

New Jersy Institute of Technology (NJIT), NJIT Researchers Patent a Process to Use Fly Ash Waste to Make Stronger Concrete(Ref. #33), Mar. 9, 2000, http://www.njit.edu/v2/News/Releases/33.html.

Kevin Copeland, Fly Ash Properties and Uses, Monolithic Dome Articles, Dec. 2, 2003, http.//www.monolithic.com/construction/flyash/.

P.K. Mehta, Role of Flyash in Sustainable Development, Building-Green.com, Dec. 8, 1998, http://www.buildinggreen.com/features/flyash/mehta.cfm.

Portland Cement Association, Effects of Substances on Concrete and Guide to Protective Treatments, 2001, pp. 1-36.

Bulletin 1-28, ISG Resources, Feb. 2003.

Percy Harrison, et al., The Cassell Dictionary of Chemistry. A Cassell Book, 1998, UK.

Coal Remining Best Managment Practices Guidance Manual, Office of Water Office of Science and Technology Engineering and analysis Division U.S. Environmental Protection Agency, Dec. 2001, pp. 17 & 23.

Takeshi Yamamoto, A Proposal Convenient Assessing Method for the Preventive Effect of Fly Ash on Alkali-Silica Reaction, Annual Research Report, 2001, pp. 52-53, Central Research Institute of Electric Power Industry, Japan.

SEFA Group, What is Fly Ash?: Technical Advantages of Fly Ash in Hardened Concrete. May 2, 2005, http://www.sefagroup.com/flyash_hardened_concrete.htm.

* cited by examiner

CEMENTITIOUS COMPOSITION

RELATED APPLICATIONS

The present application claims the benefit of U.S. Provisional Application Ser. No. 61/800,999, filed Mar. 15, 2013. The present application is related to U.S. Pat. No. 7,442,248.

FIELD OF THE INVENTION

The present application relates to improved cementitious compositions and improved methods of curing same.

BACKGROUND OF THE INVENTION

Pozzolan accelerators comprising "zeolite" or "feldspathoid" catalysts have been used to increase the practical amount of Portland Cement replacement with pozzolan in cementitious blends. Unfortunately, cementitious compositions comprising pozzolans and "zeolite" or "feldspathoid" catalysts do not tend to exhibit a sufficiently high 28 day compressive strength in actual use in certain applications.

BRIEF DESCRIPTION OF THE DRAWINGS

Comparative

BRIEF SUMMARY

Figure 1:
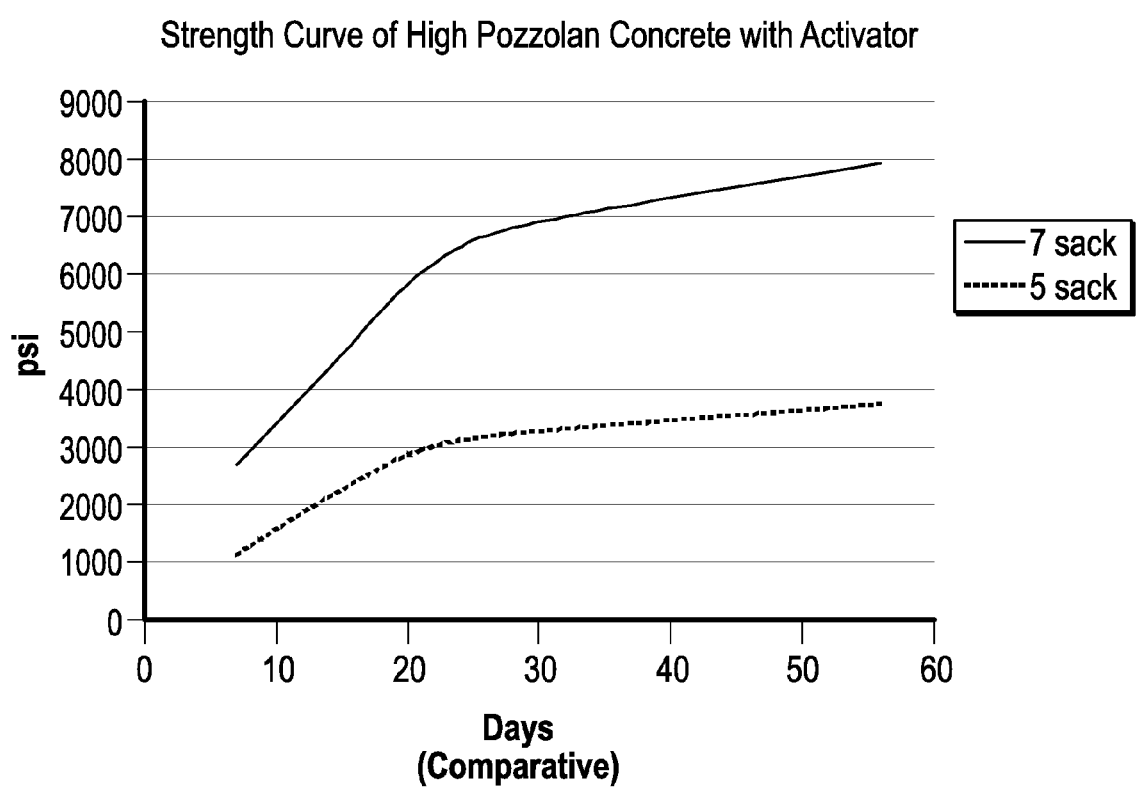
FIG. 1 depicts the predicted strength curve of high pozzolan concrete with catalyst from U.S. Pat. No. 7,442,248.
Figure 2:
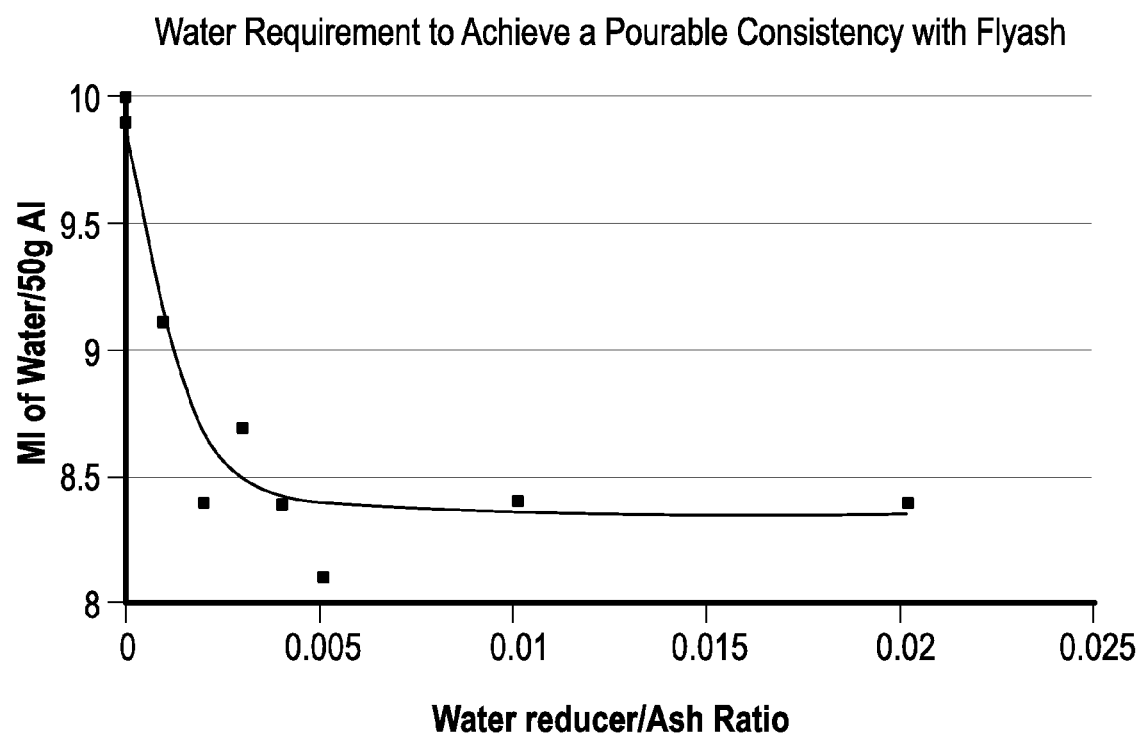
FIG. 2 is a graph depicting the water requirement to achieve a pourable consistency with flyash.

In one embodiment, the present application provides a hydrated cementitious blend comprising:
  a dry cementitious blend comprising the following, based on the total weight of the dry cementitious blend:
    aggregate comprising less than 3 wt. % calcium, based on the total weight of the aggregate;
    from about 75 wt. % to 82 wt. % pozzolonic material comprising improved ash comprising particles meeting the ASTM C 989-2010 testing protocol for grade 100 slag quality or higher, the improved ash being selected from the group consisting of fly ash, calcined or uncalcined volcanic ash, rice hull ash, and combinations thereof;
    a catalytically effective quantity of catalyst selected from the group consisting of alkali-containing zeolite, alkali-containing feldspathoid, and combinations thereof; and,
    an amount of water reducing component;
  the hydrated cementitious blend further comprising an amount of water producing a ratio of water to cementitious blend of from about 0.20 to about 0.30 and a slump of 6 or more;
  the hydrated cementitious blend producing a product cement exhibiting a compressive strength of 4000 psi or more after curing for 28 days at 75° F. or more.

In one embodiment, the application provides a hydrated cementitious blend comprising:
  a dry cementitious blend comprising the following, based on the total weight of the dry cementitious blend:
    aggregate comprising less than 3 wt. % calcium, based on the total weight of the aggregate;
    from about 75 wt. % to 82 wt. % pozzolonic material comprising improved fly ash comprising particles meeting the ASTM C 989-2010 testing protocol for grade 100 slag quality or higher;
    a catalytically effective quantity of catalyst selected from the group consisting of alkali-containing zeolite, alkali-containing feldspathoid, and combinations thereof; and,
    an amount of water-reducing component;
  the hydrated cementitious blend further comprising an amount of water producing a ratio of water to cementitious blend of from about 0.20 to about 0.30 and a slump of from 6 to 12;
  the hydrated cementitious blend producing a product cement exhibiting a compressive strength of 4000 psi or more after curing for 28 days at 75° F. or more.

In one embodiment, the application provides a method comprising:
  providing a dry cementitious blend comprising the following, based on the total weight of the dry cementitious blend:
    aggregate comprising 3 wt. % or less calcium, based on the total weight of the aggregate;
    from about 75 wt. % to 82 wt. % pozzolonic material comprising improved ash comprising particles meeting the ASTM C 989-2010 testing protocol for grade 100 slag quality or higher, the improved ash being selected from the group consisting of fly ash, calcined or uncalcined volcanic ash, rice hull ash, and combinations thereof; and,
    catalyst selected from the group consisting of alkali-containing zeolite, alkali-containing feldspathoid, and combinations thereof; and,
    an amount of water reducing component;
  blending the dry cementitious blend with an amount of water producing a hydrated cementitious blend exhibiting a ratio of water to cementitious blend of from about 0.20 to about 0.30 and a slump of from 6 to 12 inches; and,
  curing the hydrated cementitious blend at a temperature of 75° F. or more for 28 hours or more, producing a cementitious product having a compressive strength of 4000 psi or more.

DETAILED DESCRIPTION

The present application provides a dry cementatious blend comprising 40 wt. % or more pozzolonic material. In one embodiment, the dry cementitious blend comprises 70 wt % or more pozzolonic material In one embodiment, the dry cementitious blend comprises 75 wt % or more pozzolonic material In one embodiment, the dry cementitious blend comprises up to 82 wt % pozzolonic material Upon hydration, the hydrated cementitious blend cures at relatively low temperatures and the cementitious compositions produced at various curing stages exhibit excellent compressive strength. Concrete products formed using the dry cementitious blends are durable, have superior freeze-thaw resistance without the use of air-entraining admixtures, have superior sulfate and sulfuric acid resistance, exhibit excellent resistance to abrasion, exhibit autogeneous healing effect, and are more impermeable to moisture and chloride than other concretes and mortars. In one embodiment, upon hydration of a cement product, the autogenous healing effect produces a stronger cement product than the original cement product.

In one embodiment, the relatively low temperatures are: greater than freezing. In one embodiment, the relatively low temperatures are: 33° F. or more; 35° F. or more; 40° F. or more; 45° F. or more; 50° F. or more; 51° F. or more; 52° F. or more; 53° F. or more; 54° F. or more; 55° F. or more; 56° F. or more; 57° F. or more; 58° F. or more; 59° F. or more; 60° F. or more; 61° F. or more; 62° F. or more; 63° F. or more; 64° F. or more; 65° F. or more; 66° F. or more; 67° F. or more; 68° F. or more; 69° F. or more; 70° F. or more; 71° F. or more; 72° F. or more; 73° F. or more; 74° F. or more; or, 75° F. or more.

In one embodiment, the application provides a hydrated cementitious blend that produces a cementitious composition having a compressive strength of about 4000 or more after curing for 28 days at 75° F. or more. In one embodiment, the hydrated cementitious blend produces a cementitious composition that exhibits a compressive strength of 5000 psi or more after curing for 28 days or more at 75° F. or more.

In general, the term "cementitious blend" refers to materials including those typically required to make cement. Generally speaking, cementitious materials are binder materials that harden to form a connecting medium between solids. Cementitious materials include, for example, cements. Cements include, for example, any mixture of finely-ground lime, alumina, and silica that will set to a hard product that combines with other ingredients to form hydrates. Examples of cements include, but are not necessarily limited to Portland Cement, hydraulic cement, blended cement, masonry cement, mortar, and related aggregates, admixtures and/or additives including hydrated lime, limestone, chalk, calcareous shell, talc, slag or clay.

In one embodiment, a dry cementitious blend comprises aggregate, pozzolonic material comprising ash; catalyst; water reducing component, and any other dry additives. In one embodiment, the dry cementitious blend further comprises alkaline earth metal. In one embodiment, the dry cementitious blend may comprise other additive materials.

Aggregate

In one embodiment, the aggregate comprises less than 3 wt. % calcium, based on the total weight of the aggregate. In one embodiment, the aggregate comprises rock. In one embodiment, the aggregate comprises sand. In one embodiment, the aggregate comprises a combination of rock and sand.

Pozzolonic Material

Raw pozzolonic materials are inorganic materials, either naturally occurring or industrial by-products typically comprising siliceous compounds or siliceous and aluminous compounds. Examples of raw pozzolonic materials include, but are not necessarily limited to one or a combination of commercially available pozzolans including coal fly ash, silica fume, diatomaceous earth, calcined or uncalcined diatomite, calcined fullers earth, pozzolonic clays, calcined or uncalcined volcanic ash, bagasse ash, rice hull ash, natural and synthetic zeolites, metakaolin, slag and other sources of amorphous silica.

In one embodiment, the pozzolonic material comprises improved ash selected from the group consisting of fly ash, calcined or uncalcined volcanic ash, rice hull ash, and combinations thereof. Examples of suitable fly ash include, but are not necessarily limited to, Class F, Class C, or Class N as defined in ASTM C-618, "Specification for Coal Fly ash and Raw or Calcined Natural Pozzolan for Use as a Mineral Admixture in Portland Cement Concrete." In one embodiment, the improved ash is obtained from other commercial sources, including but not necessarily limited to Boral Material Technologies; ISG; and, LaFarge. In one embodiment, raw ash is obtained from a commercial source and treated to produce improved ash.

Raw ash typically has a particle size that is relatively large. Raw Class C fly ash has a particle size distribution that is less than raw Class F fly ash. Raw Class C fly ash may have some particles that are less than 100 microns. Raw Class F fly ash typically has a particle size distribution in the range of about 170-200 microns, or even more. Generally, raw fly ash tested under the ASTM C 989-2010 testing protocol will not pass the Grade 80 slag quality. In particular, raw Class F fly ash tested under the ASTM C 989-2010 testing protocol will not pass the Grade 80 slag quality. Without limiting the application to a particular theory of operation, it is believed that such relatively large particles provide relatively little surface area during curing of a hydrated cementitious blend.

In one embodiment, the application provides a dry cementitious blend comprising improved ash that passes ASTM C 989-2010 testing protocol for Grade 100 slag quality or higher. In one embodiment, the improved ash has an increased exposed surface area compared to the raw ash. In one embodiment, the improved ash comprises spherical particles having an increased surface area.

The exposed surface area of the raw ash may be increased to produce improved ash in any suitable fashion. In one embodiment, the exposed surface area of the raw ash is increased to produce improved ash by air classification, milling, and combinations thereof. In one embodiment, the improved ash has a surface area that is increased 30% or more compared to the raw ash. In one embodiment, the raw ash is milled to produce the improved ash. In one embodiment, the exposed surface area of the raw ash is increased to produce the improved ash using the method described in U.S. patent application Ser. No. 13/647,838 (pending), incorporated herein by reference.

In one embodiment, the improved ash has surface area that is increased, compared to the raw ash, by: 31% or more; 32% or more; 33% or more; 34% or more; 35% or more; 36% or more; 37% or more; 38% or more; 39% or more; 40% or more; 41% or more; 42% or more; 43% or more; 44% or more; 45% or more; 46% or more; 47% or more; 48% or more; 49% or more; 50% or more; 51% or more; 52% or more; 53% or more; 54% or more; 55% or more; 56% or more; 57% or more; 58% or more; 59% or more; 60% or more; 61% or more; 62% or more; 63% or more; 64% or more; 65% or more; 66% or more; 67% or more; 68% or more; 69% or more; 70% or more. In one embodiment, the claimed ash has a 75% or less increase in exposed surface area.

In one embodiment, the improved ash has a smaller average particle size than raw ash. In one embodiment, the improved ash has a smaller largest particle size than raw ash. As used herein, the phrase "particle size" or "largest particle size" refers to particle sizes as indicated on a curve that is produced using a laser particle size analyzer. On understanding and belief, particle size analyzers measure particle sizes using a laser diffractometer and/or ultrasonic sieves. Examples of suitable laser particle size analyzers include the Horiba 9000, commercially available from Horiba, or a Beckman Coulter particle size analyzer. Particle size analyzers generally produce a curve indicating the smallest to largest particles in the sample, dependent on the range of the analyzer. Results generally are given for the "average particle size diameter" or "average PSD", and for the % passing various sizes as desired by the operator. In one embodiment the phrase "largest particle size" does not exclude trace amounts of particles having a largest particle size over 30 microns. "Trace amounts" refers to amounts of from 3-5% of total particles.

In one embodiment, the improved ash has a largest particle size of: about 100 microns or less; about 90 microns or less; about 80 microns or less; about 70 microns or less; about 60 microns or less; about 50 microns or less; about 40 microns or less; or, about 30 microns or less. In one embodiment, the improved ash has a largest particle size of 30 microns or less.

In one embodiment, the improved ash has a largest particle size of about 50 microns or less; 49 microns or less; 48 microns or less; 47 microns or less; 46 microns or less; 45 microns or less; 44 microns or less; 43 microns or less; 42 microns or less 41 microns or less; 40 microns or less; 39 microns or less; 38 microns or less; 37 microns or less; 36 microns or less; 35 microns or less; 34 microns or less; 33 microns or less; 32 microns or less; 31 microns or less; or, 30 microns or less; 29 microns or less; 28 microns or less; 27 microns or less; 26 microns or less; 25 microns or less; 24 microns or less; 23 microns or less; 22 microns or less; 21 microns or less; 20 microns or less. In one embodiment, the improved ash has a largest particle size of: 1 micron or more; 2 microns or more; 3 microns or more; 4 microns or more; 5 microns or more; 6 microns or more; 7 microns or more; 8 microns or more; 9 microns or more; 10 microns or more; 11 microns or more; 12 microns or more; 13 microns or more; 14 microns or more; 15 microns or more; 16 microns or more; 17 microns or more; 18 microns or more; 19 microns or more; 20 microns or more; 21 microns or more; 22 microns or more; 23 microns or more; 24 microns or more; 25 microns or more; 26 microns or more; 27 microns or more; 28 microns or more; or 29 microns or more.

Raw ash typically has a surface area of from about 0.6 to about 0.75 m$^2$/gm. In one embodiment, the improved ash has a surface area of from about 0.8 to about 1 m$^2$/gm. In one embodiment, the improved ash is Class F fly ash, as defined in ASTM C-618, "Specification for Coal Fly ash and Raw or Calcined Natural Pozzolan for Use as a Mineral Admixture in Portland Cement Concrete." In one embodiment, raw Class F fly ash typically has an average particle size of from about 100 to 200 microns and an exposed surface area of 0.68 m$^2$/g. In one embodiment, in addition to reduced particle size, the improved Class F fly ash has an exposed surface area of 1.10 m$^2$/g or more.

In one embodiment, the ash comprises particles passing ASTM C 989-2010 testing protocol for Grade 100 slag quality or higher. In one embodiment, the improved ash comprises particles passing ASTM C 989 testing protocol for Grade 110 slag quality or higher. In one embodiment, the ash comprises particles passing ASTM C 989 testing protocol for Grade 120 slag quality or higher. In one embodiment the improved ash is a 1.0 grade or higher POZZOSLAG®, a registered trademark of VHSC Cement LLC, Jewett, Tex. In one embodiment, the improved as is a 1.2 grade or higher POZZOSLAG®, obtained from VHSC Cement LLC.

Raw Class F flyash has been used to replace the following amounts of Portland cement in the dry cementitious blend: 15% or more, 16% or more, 17% or more, 18% or more, 19% or more, up to a maximum of about 20%.

In contrast, improved fly ash successfully has been used to replace the following amounts of Portland cement: 30% or more; 31% or more; 32% or more; 33% or more; 34% or more; 35% or more; 36% or more; 37% or more; 38% or more; 39% or more; 40% or more; 41% or more; 42% or more; 43% or more; 44% or more; 45% or more; 46% or more; 47% or more; 48% or more; 49% or more; 50% or more; 51% or more; 52% or more; 53% or more; 54% or more; 55% or more; 56% or more; 57% or more; 58% or more; 59% or more; 60% or more; 61% or more; 62% or more; 63% or more; 64% or more; 65% or more; 66% or more; 67% or more; 68% or more; 69% or more; 70% or more; 71% or more; 72% or more; 73% or more; 74% or more; 75% or more; 76% or more; 77% or more; 78% or more; 79% or more; 79% or more; 80% or more. Using routine experimentation, it may be possible to replace even more Portland cement with improved fly ash. In one embodiment, the following amounts of Portland cement were replaced with improved fly ash: 82% or less; 81% or less; 80% or less; 79% or less; or, 78% or less. In various embodiments, the improved fly ash was used to replace the following amount of Portland cement: 70% or more; 71% or more; 72% or more; 73% or more; 74% or more; 75% or more; 76% more; 77% or more; or 78% or more. In one embodiment, the improved fly ash was used to replace 78% or less of the Portland cement in the dry cementitious blend. In one embodiment, the improved fly ash was Class F fly ash.

In one embodiment, based on the total weight of the dry cementitious blend, the dry cementitious blend comprises the following wt. % of pozzolonic material comprising improved ash: 40 wt. % or more; 45 wt. % or more; 50 wt. % or more; 51 wt. % or more; 52 wt. % or more; 53 wt. % or more; 54 wt. % or more; 55 wt. % or more; 56 wt. % or more; 57 wt. % or more; 58 wt. % or more; 59 wt. % or more; 60 wt. % or more; 61 wt. % or more; 62 wt. % or more; 63 wt. % or more; 64 wt. % or more; 65 wt. % or more; 66 wt. % or more; 67 wt. % or more; 68 wt. % or more; 69 wt. % or more; 70 wt. % or more; 71 wt. % or more; 72 wt. % or more; 73 wt. % or more; 74 wt. % or more; 75 wt. % or more; 76 wt. % or more; 77 wt. % or more; 78 wt. % or more; 79 wt. % or more; 80 wt. % or more; 81 wt. % or more; up to 82 wt. %.

Greater acid resistance is exhibited when the dry cementitious blend comprises a higher wt. % of pozzolonic material. In one embodiment, based on the total weight of the dry cementitious blend, the dry cementitious blend comprises the following wt. % of pozzolonic materials comprising improved ash: 70 wt. % or more; 71 wt. % or more; 72 wt. % or more; 73 wt. % or more; 74 wt. % or more; 75 wt. % or more; 76 wt. % or more; 77 wt. % or more; 78 wt. % or more; 79 wt. % or more; 80 wt. % or more; 81 wt. % or more; up to 82 wt. %. In one embodiment, the dry cementitious blend comprises 75 wt. % or more of the pozzolonic material comprising improved ash. In one embodiment, based on the total weight of the cementitious blend, the cementitious blend comprises the following wt. % of pozzolonic material comprising improved ash: less than 82 wt. %; less than 81 wt. %; less than 80 wt. %; less than 79 wt. %; 78 wt. % or less.

It may be possible to replace all of the alkaline earth metal (preferably calcium-containing material, such as Portland cement) in the dry cementitious blend with the improved ash; however, hydrated cementitious blends with no calcium-containing material require higher curing temperatures and/or longer curing times to achieve a given compressive strength. Accordingly, cementitious blends comprising no alkaline earth metals likely would be less convenient to use in the field.

The dry cementitious composition also may comprise other pozzolans. Suitable other pozzolans, include, but not necessarily limited to amorphous silica or vitreous silica (hereafter "silica"). In one embodiment, the dry cementitious composition comprises the following % by weight of silica: about 10% or more; about 15% or more; about 20% or more; about 21% or more about 22% or more about 23% or more about 24% or more about 25% or more; about 26% or more; about 27% or more; about 28% or morel about 29% or more; about 30% more; about 31% more; about 32% more; about 33% more; about 34% more; about 35% or more; about 36% more; about 37% more; about 38% more; about 39% more; about 40% or more; about 41% or more; about 42% or more; about 43% or more; about 44% or more; about 45% or more; about 46% or more; about 47% or more; about 48% or more; about 49% or more; about 50% or less. In one embodiment, the dry cementitious composition comprises the following % by weight silica: about 49% or less; about 48% or less; about 47% or less; about 46% or less; about 45% or less; about 44% or less; about 43% or less; about 42% or less; about 41% or less; about 40% or less. In one embodiment, the pozzolonic material comprise from about 20% to about 40% by weight silica. In one embodiment, the pozzolonic material comprises about 35% by weight silica.

Catalyst

In one embodiment, the dry cementitious blend also comprises a catalytically effective amount of catalyst. In one embodiment, the catalyst is a pozzolan accelerator. In one embodiment, the catalyst is a commercially available pozzolan accelerator.

Examples of suitable catalyst include, but are not necessarily limited to mesopore-structured materials. Mesopore-structured materials are crystalline or amorphous metal oxides having essentially regularly structured pore systems having an average pore size, for example, in the range of about 1.5 to about 5 nanometers. In one embodiment, the catalyst comprises one or more alkali-containing mesopore-structured material. In one embodiment, the mesopore-structured materials are "zeolite" catalyst and/or "feldspathoid" catalyst.

In one embodiment, the catalyst comprises one or more zeolite. Zeolites are crystalline, hydrated aluminosilicates. Compositionally, zeolites are similar to clay minerals. Zeolites differ, however, in their crystalline structure. Whereas many clays have a layered crystalline structure (similar to a deck of cards) and are subject to shrinking and swelling as water is absorbed and removed between the layers, zeolites have a rigid, 3-dimensional crystalline structure (similar to a honeycomb) consisting of a network of interconnected tunnels and cages. Water moves freely in and out of these pores but the zeolite framework remains rigid. Another special aspect of this structure is that the pore and channel sizes are nearly uniform, allowing the crystal to act as a molecular sieve. Suitable zeolites may be either naturally-occurring or synthetic in origin. Preferred naturally-occurring zeolites include, but are not necessarily limited to one or a mixture of analcime, chabazite, gmelinite, mordenite, natrolite, faujasite, phillipsite, sodalite, nepheline, scapolite, cancrinite, erionite and clinoptilolite. In one embodiment, the synthetic zeolites include, but are not necessarily limited to one or a mixture of a Class A, Class X, SYNTHETIC CLINOPTILOLITE, Class B, Class F, Class K-F, Class G, Class P-B, Class P-C, Class Z, Class ZK-19, Class ZSM-2 and Class ZSM-3, most preferably Class A zeolites.

The porous zeolite is host to water molecules and ions of potassium and calcium, as well as a variety of other positively charged ions, but only to those ions of appropriate molecular size to fit into the zeolite pores and create a "sieving" property. In one embodiment, the zeolite comprises one or more alkali metal ions. In one embodiment, the zeolite comprises sodium ions.

In one embodiment, the catalyst comprises one or more feldspathoid comprising one or more alkali metal(s). Feldspathoids are similar in chemical composition and structure to zeolites and have open cavities within the aluminosilicate structure capable of containing alkali metals. As such, feldspathoids are similar to zeolites in that they are pozzolonic and have exchangeable alkali ions. Suitable feldspathoids include, but are not necessarily limited to, nepheline (NaAlSiO$_4$ with a little potassium) and leucite (KAlSi$_2$O$_6$). Such catalysts may be obtained a variety of commercial sources, including but not necessarily limited to PQ Corporation and Zeolyst International.

In one embodiment, the one or more alkali metal(s) in the catalyst are the source of the alkali in the catalyzed reaction between the pozzolonic material and alkaline earth metal. In one embodiment, the one or more "alkali metal(s)" in the catalyst react pozzolonically with calcium to release the alkali metal.

"Pozzolanic activity," refers herein to the ability of silica and alumina components of ash to react with available calcium and/or magnesium. In one embodiment, the available calcium and/or magnesium are from the hydration products of Portland Cement. ASTM C618 requires that the pozzolanic activity index with Portland Cement, as determined in accordance with ASTM C311, be a minimum of 75 percent of the average 28-day compressive strength of control mixes made with Portland Cement. The optimum amount of zeolite or feldspathoid necessary to catalyze the reaction is dependent upon the reactive nature of the pozzolonic material and can be determined by producing test articles containing varying amounts of the zeolite or feldspathoid. Another factor used to determine the amount of catalyst in a given dry cementitious blend is the desire to control or prevent efflorescence, the amount of air-entraining agents used, and the amount of the chemical and solid components used.

In one embodiment, based on the total wt. % of the dry cementitious blend, the following amount of catalyst is used when the improved ash is an improved Class F fly ash: 0.1% by weight or more; 0.2% by weight or more; 0.3% by weight or more; 0.4% by weight or more; 0.5% by weight or more; 0.6% by weight or more; 0.7% by weight or more; 0.8% by weight or more; 0.9% by weight or more; 1% by weight or more; 1.5% by weight or more; 2% by weight or more; 2.5% by weight or more; 3% by weight or more; 3.5% by weight or more; 4% by weight or more; 4.5% by weight or more; 5% by weight or more; 5.5% by weight or more; 6% by weight or more; 6.5% by weight or more; 7% by weight or more; 7.5% by weight or more; 8% by weight or more; 8.5% by weight or more; 9% by weight or more; 9.5% by weight or more; or, about 10% by weight or less. In one embodiment, the catalyst is zeolite.

In one embodiment, the cementitious blend comprises pozzolonic material comprising improved Class F fly ash, the catalyst is zeolite, and the dry cementitious blend comprises the following amount of zeolite: about 2% by weight or more; about 2.1% by weight or more; about 2.2% by weight or more; about 2.3% by weight or more; about 2.4% by weight or more; about 2.5% by weight or more; about 2.6% by weight or more; about 2.7% by weight or more; about 2.8% by weight or more; about 2.9% by weight or more; about 3% by weight or more; about 3.1% by weight or more; about 3.2% by weight or more; about 3.3% by weight or more; about 3.4% by weight or more; about 3.5% by weight or more; about 3.6% by weight or more; about 3.7% by weight or more; about 3.8% by weight or more; about 3.9% by weight or more; or, about 4% by weight or less.

In one embodiment, the dry cementitious blend comprises pozzolonic material comprising improved Class C fly ash, the catalyst is zeolite, and the dry cementitious blend comprises the following amount of zeolite: about 0.1% by weight or more; about 0.5% by weight or more; about 1.0% by weight or more; about 1.5% by weight or more; about 2% by weight or more; about 2.5% by weight or more; about 3% by weight or more; about 3.5% by weight or more; about 4% by weight or more; about 4.5% by weight or more; about 5% by weight or more; about 5.5% by weight or more; about 6% by weight or more; about 6.5% by weight or more from about 7% by weight or more; about 7.5% by weight or more; about 8% by weight or more; about 8.1% by weight or more; about 9% by weight or more; about 9.5% by weight or more; about 10% by weight or less.

In one embodiment, the cementitious blend comprises pozzolonic material comprising improved Class C fly ash, the catalyst is zeolite, and the dry cementitious blend comprises the following quantity of zeolite: about 0.5% by weight or more; about 0.6% by weight or more; about 0.7% by weight or more; about 0.8% by weight or more; about 0.9% by weight or more; about 1% by weight or more; about 1.1% by weight or more; about 1.2% by weight or more; about 1.3% by weight or more; about 1.4% by weight or more; about 1.5% by weight; 1.5% by weight or less.

Where less rapid setting is desired, the percentage of catalyst in the dry cementitious blend can be reduced. Where more rapid setting is desired, the percentage of catalyst in the dry cementitious blend can be increased. In one embodiment, upon addition of sufficient water and exposure to effective curing conditions, the hydrated cementitious blend is effective at a ratio of 0.02 or more catalyst to hydrated cementitious blend to produce a cementitious composition having a strength at 24 hours that is greater than the strength of the same cementitious composition made under the same conditions using NaOH as catalyst In the presence of moisture, pozzolonic materials such as ash react with alkaline earth metal, such as calcium-containing material, such as calcium hydroxide, to form compounds possessing cementitious properties. Examples of compounds possessing cementitious properties include calcium silicate hydrates, calcium aluminate hydrates and calcium silicoaluminate hydrates.

Suitable zeolites and/or feldspathoids comprise particles having an average diameter of from about 0.1 microns to about 10 microns. In one embodiment, the average diameter is obtained by grinding or pulverizing larger particles or by separation processes.

In one embodiment, the zeolites and/or feldspathoids have an average particle diameter of: about 0.1 microns or more; about 0.5 microns or more; about 1.5 microns or more; about 2.0 microns or more; about 2.5 microns or more; about 3 microns or more; about 3.51 microns or more; about 4 microns or more; about 4.5 microns or more; about 5 microns or more; about 5.5 microns or more; about 6 microns or more; about 6.5 microns or more; about 7 microns or more; about 7.5 microns or more; about 8 microns or more; about 8.5 microns or more; about 9 microns or more; about 9.5 microns or more; about 10 microns; less than 10 microns. In one embodiment, the zeolites and/or feldspathoids comprises particles having an average diameter of: about 2 microns or more; about 2.5 microns or more; about 3 microns or more; about 3.5 microns or more; about 4 microns or more; about 4.5 microns or more; about 5 microns or more; about 5.5 microns or more; about 6 microns or more; about 6.5 microns or more; about 7 microns; 7 microns or less. In one embodiment, the zeolites and/or feldspathoids have an average particle diameter of about 5 microns.

In one embodiment, the zeolites and/or feldspathoids comprise pores having an average diameter. In one embodiment, the average diameter of the pores of the zeolite and/or feldspathoid is: about 2 Å or more; about 2.1 Å or more; about 2.2 Å or more; about 2.3 Å or more; about 2.4 Å or more; about 2.5 Å or more; about 2.6 Å or more; about 2.7 Å or more; about 2.8 Å or more; about 2.9 Å or more; about 3 Å or more; about 3.5 Å or more; about 4 Å or more; about 4.5 Å or more; about 5 Å or more; about 5.5 Å or more; about 6 Å or more; about 6.5 Å or more; about 7 Å or more; about 7.5 Å or more; or, about 8 Å or less. In one embodiment, the zeolites and/or feldspathoids comprise pores having an average diameter of: about 3 Å or more; about 3.1 Å or more; about 3.2 Å or more; about 3.3 Å or more; about 3.4 Å or more; about 3.5 Å or more; about 3.6 Å or more; about 3.7 Å or more; about 3.8 Å or more; about 3.9 Å or more; about 4 Å or more; about 4.1 Å or more; about 4.2 Å or more; about 4.3 Å or more; about 4.4 Å or more; about 4.5 Å or more; about 4.6 Å or more; about 4.7 Å or more; about 4.8 Å or more; about 4.9 Å or more; about 5 Å or less. In one embodiment, the zeolites and/or feldspathoids comprise pores having an average diameter of about 4.2 Å.

In one embodiment, the catalyst accelerates the reaction between the ash and any alkaline earth metal present in the cementitious blend. In one embodiment, the catalyst (1) allows for higher concentrations of pozzolonic material (replacing the alkaline earth metal) in the cementitious blend; (2) allows for superior rates of strength gain compared to known compositions; and (3) provides a non-caustic alternative to other pozzolan accelerators generally known and used in the art.

All of the above ingredients can be ground or blended, either separately or together, and used as a complete cementitious blend with or without additional admixtures.

Alkaline Earth Metal

In a preferred embodiment, the cementitious blend comprises a quantity of alkaline earth metal effective to react with the pozzolonic material. Suitable alkaline earth metals include but are not necessarily limited to: calcium, magnesium, beryllium, strontium, and barium. In one embodiment, the alkaline earth metals are selected from the group consisting of calcium, magnesium, and combinations thereof. In one embodiment, the cementitious blend comprises a quantity of "calcium-containing material." In one embodiment, the cementitious blend comprises a quantity of "calcium-containing material" including, but not necessarily limited to materials comprising compound(s) selected from the group consisting of CaO, $Ca(OH)_2$, and combinations thereof. Examples of suitable calcium-containing materials include, but are not necessarily limited to one or a mixture of Portland Cement, calcium aluminate cement, calcium sulfoaluminate cement, hydrated lime, quicklime and lime kiln dust. In one embodiment, the calcium-containing material is Portland Cement. Suitable Portland Cement includes all types of Portland Cement (I-V and as referenced in ASTM C 150-95. Of course, the particular calcium-containing material used will depend, particularly in the poorest areas of the world, on the most readily available, inexpensive option. In one embodiment, the calcium-containing material is obtained from one or more of the following commercial sources: Texas Industries, Inc.; California Portland Cement Co.; and North Texas Cement Company; Cemex; Alamo Cement; and, T3 International.

Portland Cement is essentially a mixture of hydraulic calcium silicates and calcium aluminum silicates contained in a crystalline mass. Major compounds include tricalcium silicate, dicalcium silicate, tricalcium aluminate, tetracalcium aluminoferrite, calcium sulfate dihydrate (Gypsum), and combinations thereof.

Water-Reducing Component

In one embodiment, the dry cementitious blend comprises a water-reducing component, or a component that allows for the production of a hydrated cementitious composition having a desired workable consistency while using less water. In one embodiment, the dry cementitious blend comprises a type and quantity of water-reducing component that produces a hydrated cementitious composition exhibiting a desired workability at a ratio of water to cementitious blend of from about 0.20 to about 0.30. In one embodiment, the hydrated cementitious composition exhibits a desired workability at a ratio of water to cementitious blend of: 0.21 or more; 0.22 or more; 0.23 or more; 0.24 or more; 0.25 or more; 0.26 or more; 0.27 or more; 0.28 or more; 0.29 or more; or 0.30 or less. In one embodiment, the hydrated cementitious blend exhibits a desired workability at a ratio of water to cementitious blend of less than 0.30.

Without limiting the application to a particular theory of operation, a higher water content lowers the concentration of all of the ingredients in the hydrated cement composition. The water-reducing component is believed to keep the hydrated cement composition at a flowable consistency while maintaining a relatively low concentration of water. Lowering the required water content increases the concentration of other ingredients besides water in the hydrated cement composition. The more concentrated mixture allows the pozzolonic reaction to occur at a rate effective to produce desired compressive strengths.

In one embodiment, the type and amount of water-reducing component is effective to permit the use of a water to concrete ratio within a desired range for a particular application. In one embodiment, the desired range is from about 0.20 to about 0.30. In one embodiment, the water-reducing component (a) reduces to from about 0.20 to about 0.30 the ratio of water to cementitious blend required to produce a hydrated cementitious blend having a desired workable consistency, and (b) produces a cement composition that exhibits a compressive strength of 4000 psi or more after curing for 28 days at 75° F. or more.

The amount of water-reducing component used in the dry cementitious blend will vary depending upon the desired workable consistency of the resulting hydrated cementitious blend. In one embodiment, the amount of water-reducing component in the dry cementitious blend decreases by about 10% or more the amount of water required to produce a hydrated cementitious blend exhibiting the desired the workable consistency.

In one embodiment, suitable water-reducing components include, but are not necessarily limited to, calcium or alkali salts of sulfonated lignin (such as DARACEM-19® and DARACEM-100®) hydroxylated polymers and copolymers, salts of hydroxy carboxylic acids (especially sodium citrate and sodium gluconate), salts of condensation polymers of melamine urea and melamine formaldehyde, salts of condensation polymers of sulfonated naphthalene formaldehyde (such as BOREM B-600 CNL, BOREM 100-HNL, BOREM 100-HSP), formaldehyde/urea polymers, carboxylated polyethers (such as ADVA FLOW®), preferably sulfonated condensation copolymers of formaldehyde and ketones.

In one embodiment, the water-reducing component is a polycarboxylate water-reducing component. Polycarboxylates have the advantage of tending to be easier to use and to give better water reduction and flowability results in a "wet pour" hydrated cementitious composition. A variety of polycarboxylate water-reducing components are commercially available. In one embodiment, the polycarboxylate water-reducing component is a generic polycarboxylate commercially available from Shanghai Bosun Supply Chain Management Co Ltd. In one embodiment, the polycarboxylate water-reducing components are plasticizers. In one embodiment, the polycarboxylate water-reducing components are superplasticizers. In one embodiment, the polycarboxylate is a plasticizer commercially available from SIKA® AG Société Anonyme SWITZERLAND Zugerstrasse 50 CH-6341 Baar SWITZERLAND (SIKA®). In one embodiment, the polycarboxylate water-reducing component is a superplasticizer commercially available from SIKA®. In one embodiment, the polycarboxylate water-reducing component is a VISCOCRETE® powder, registered trademark last assigned to by SIKA® AG CORPORATION SWITZERLAND ZUGERSTRASSE 50 BAAR SWITZERLAND CH6341. In one embodiment, the polycarboxylate water-reducing component is a VISCOCRETE®-225 Powder.

As with other types of water-reducing components, the amount of polycarboxylate water-reducing component used in the dry cementitious blend will vary depending upon the desired workable consistency of the resulting hydrated cementitious blend. In one embodiment, the polycarboxylate water-reducing component is used in an the following amount, based on the total weight of the dry cementitious blend: 0.3 wt. % or more; 0.4 wt. % or more; 0.5 wt. % or more; 0.6 wt. % or more; 0.7 wt. % or more; 0.8 wt. % or more; 0.9 wt. % or more; or, 1 wt. % or less.

Additional Components

In addition to the components described above, other components may be added for particular purposes. For example, expanded fillers can be added to form lightweight cinder blocks and tile. Examples of expanded fillers include, but are not necessarily limited to hollow glass cenospheres, glass or polymer microspheres, vermiculite, expanded pearlite, expanded polystyrene, expanded shale or clay, synthetic lightweight aggregate, and combinations thereof. The amount of expanded filler added can vary widely depending upon the density and strength desired in the final product.

Additional components may be used, for example, to (1) further accelerate the very early strength (1 to 3-day strength) of the cementitious composition, and (2) modify the viscosity (i.e., viscoelastic properties) of the cementitious composition (using a viscosity modifier). Each component may be added to a particular composition in an amount sufficient to produce acceptable qualities for a particular application.

—Viscosity Modifiers

Segregation may occur in the hydrated cementitious blend when using high-range water-reducing admixtures. Segregation is defined as the settlement of aggregate from the hydrated cementitious blend due to viscosity thinning. The viscoelastic properties of the hydrated cementitious blend may be modified to reduce or prevent segregation using viscosity modifiers (sometimes referred to as viscosity enhancing agents). Suitable viscosity enhancing agents include, but are not necessarily limited to, hydroxyethyl cellulose, guar gum, carageenan gum, various clays, salts of acrylic acid and acrylic acid copolymers, acrylamide polymers and copolymers of acrylamide. In addition, all of the above mentioned ingredients, including water-reducing components alone, or in combination with viscosity enhancing agents, may further be used in the manufacture of self-consolidating concrete (SCC).

—Early Strength Enhancers

The dry and/or hydrated cementitious blend also may comprise one or more early strength enhancer. Typical early strength enhancers include, but are not necessarily limited to calcium salts such as calcium chloride, calcium nitrate, calcium lactate, calcium formate, calcium bromide, and combinations thereof. Other non-calcium early strength enhancers include, but are not necessarily limited to thiosulfates, thiocyanates, amines (especially triethanolamine), glyoxal, urea, formaldehyde, aluminates, such as sodium aluminate or aluminum trihydroxide, and combinations thereof.

Water

Water or (a suitable aqueous solution) is mixed with the dry cementitious blend in the amount required to produce a hydrated cementitious blend having a workable consistency for a desired use. In one embodiment, water is added after the dry ingredients discussed above are thoroughly admixed. The amount of water used in the hydrated cementitious blend depends on the ultimate use of the composition (i.e., floor or wall, or building products such as cinder block, etc.). A person of ordinary skill in the art using routine experimentation can determine the amount of water necessary to produce a workable composition for a particular use.

All components of the hydrated cementitious blend can be mixed using either a batch mixer or a continuous mixer (i.e., mobile truck mixer). Suitable volumetric mixers include, but are not necessarily limited to manual volumetric mixers, stationary automated volumetric concrete mixers, and volumetric concrete mixer trucks. Proper mixing considerations include for instance: location of the construction site (distance to a ready-mix plant), the amount of product needed, the construction schedule (volume of product needed per hour), the cost of the mixing method, and the quality of the mixture desired (i.e. distributing all the components uniformly). In one embodiment, the hydrated cementitious composition is easily extruded, compression molded, wet poured, or cast into simple or complex shapes.

A "dry" cementitious blend exhibits a "0" inch slump. In one embodiment, the hydrated cementitious blend exhibits a relatively low slump value of from 1-2 inches. In one embodiment, the hydrated cementitious blend is a "wet pour." A "wet pour" is a hydrated cementitious blend that appears "wet" when poured after mixing in a suitable volumetric mixer.

A "wet pour" hydrated cementitious blend may exhibit a variety of slump values. In one embodiment, the hydrated cementitious blend exhibits a slump value of 6 inches or more. In one embodiment, a "wet pour" acts substantially similar to a self-consolidating concrete (SCC). SCC typically exhibits a slump of about 8 inches or more. In various embodiments, the hydrated cementitious blend exhibits a slump of more than 8 inches; 9 inches or more; 10 inches or more; 11 inches or more; or, 12 inches or less. In one embodiment, the hydrated cementitious blend exhibits a slump of from 8 to 12 inches. In one embodiment, the hydrated cementitious blend exhibits a slump of from 8 to 10 inches. In one embodiment, the hydrated cementitious blend exhibits a slump of from 10 to 12 inches.

In one embodiment, the "wet pour" exhibits a "spread." In one embodiment, the spread is: 10 inches or greater; greater than 10 inches; 11 inches or greater; 12 inches or greater; 13 inches or greater; 14 inches or greater; 15 inches or greater; 16 inches or greater; 17 inches or greater; 18 inches or greater; 19 inches or greater; 20 inches or greater.

The Pozzolonic Reaction

The hydrated cementitious composition reacts and sets rapidly at relatively low temperatures to produce a cementitious composition and eventually a product cement having desired respective compressive strengths.

Depending on the type and amount of catalyst used, the pH of the pozzolonic reaction is: from about 10 to about 14; from about 11 to about 14; from about 12 to 14.

In one embodiment, the pH of the pozzolonic reaction is about 12.

Compressive Strength

The cement can be cured at any temperature above freezing as long as the cement is cured for a sufficient period of time to achieve a desired compressive strength. The higher the temperature and the relative humidity, the more rapid the attainment of higher compressive strengths.

FIG. 1 from U.S. Pat. No. 7,442,248 illustrates previously predicted strength curves for 7 and 5 "sack" mixes using raw pozzolonic material. The term "sack" refers to the number of cubic feet of cement per yard of concrete. Referring to FIG. 1, strengths approaching 7000 psi were predicted after curing for 28 days using a recipe containing 7 cu ft. of cement per yard of concrete. In one embodiment, seven cu ft. of cement weighs 490 lbs. and contains 389 lbs. of Class C fly ash and 95 lb. of Class I Portland Cement. Unfortunately, the strength curves predicted in FIG. 1 have proved difficult to achieve in the field. This is particularly true in wet pour applications.

The present application provides improved cementitious blends and improved hydrated cementitious blends, including wet pour blends, that achieve a compressive strength of 4000 psi or more after at 28 days of curing at 75° F. or more. In one embodiment, a compressive strength of 5000 psi or more is achieved after 28 days of curing at temperatures of 75° C. or more. In one embodiment, the curing temperature is 130° F. or less. The invention will be better understood with reference to the following examples, which are illustrative only and not intended to limit the present invention to a particular embodiment.

COMPARATIVE EXAMPLES FROM U.S. PAT. NO. 7,442,248

The following is a brief discussion of the comparative examples in U.S. Pat. No. 7,442,248.

Comparative Example 1

Comparative Example 1 in U.S. Pat. No. 7,442,248 states that the strength at 24 hours was 776 psi, the 9-day strength was 3983 psi. and the strength at 29 days was 5465 psi. However, the product was 2"×2" cubes, the conditions were laboratory conditions, and the curing temperature is not discussed.

Comparative Example 2

Comparative Example 2 states that the concrete exhibited strengths of 4360 psi at 14 days, 6020 psi at 21 days, 6810 psi at 28 days and 7933 psi at 56 days, and that no water reducers or additional admixtures were used. However, the temperature of curing was not discussed, and the slump exhibited by the hydrated cementitious blend was only 3" (estimated at 200 lb.).

Comparative Example 3

Comparative Example 3 states that the concrete thus produced exhibited strengths of 1130 psi at 7 days, 2130 psi at 14 days and 3230 psi at 28 days, and that no additional admixtures or water reducers were used. However, the temperature of curing was not discussed, and the slump exhibited by the hydrated cementitious blend was only 3" (estimated at 200 lb.).

Comparative Example 4

Comparative Example 5 states that the concrete thus produced exhibited strengths of 980 psi at 4 days and 4760 psi at 28 days, and that no additional admixtures or water reducers were used. However, the temperature of curing was not discussed, and the slump exhibited by the hydrated cementitious blend was only 1" to 2."

Comparative Example 5

Each molded article produced in Comparative Example 5 was cured at the relatively high temperature of 130° F. for 15 hours, then removed from the mold. The strength of the relatively small molds cured at 130° F. fort 24 hours was 3,490 psi, and at 28 days it was 6,090 psi.

EXPERIMENTAL EXAMPLES

Experimental Example 1

A hydrated cementitious blend comprising improved ash was prepared for wet pour application. The hydrated cementitious blend comprised the following:

| Material | Amount (lb.) |
| --- | --- |
| 78 wt. % pozzolonic material comprising improved Class F fly ash* | 658 |
| 18.4 wt. % Portland Cement** | |
| 2.6 wt. % sodium A zeolite*** | |
| 1 wt. % Polycarboxylate water-reducing component*** * | |
| 1" Silica base <3% calcium | 1200 |
| 2.65 FM silica <3% calcium | 1365 |
| water to SCC type of slump | Water to cement ratio of 0.24 (or close) on both pours |

*POZZO SLAG ® 1.2, obtained from VHSC Cement.. ("VHSC")
**Obtained from T3 Int'l. ("T3")
***VALFOR ®-100 Zeolite NaA, a hydrated zeolite sodium A powder from PQ Corporation, Valley Forge, VA ("PQ')
*** *Generic polycarboxylate from Shanghai Bosun Supply Chain Management Co Ltd.

All dry ingredients were dry mixed before water was added. The water was added and the hydrated cementitious blend was poured into molds having the dimensions shown below and cured at air temperature (and concrete temperature) of 74° F. to produce a 8.5 yard batch. The cementitious mixture exhibited a slump of 8.75. The material exhibited the following compressive strengths:

| Specimen | Age (days) | Dimensions (in) Diameter | Dimensions (in) Height | Area (in²) | Ultimate Load (lbf) | Fracture | Compressive Strength (psi) | Required Strength (psi) |
| --- | --- | --- | --- | --- | --- | --- | --- | --- |
| 1 | 7 | 6.04 | 12.02 | 28.65 | 11860 | 5 | 3900 | |
| 2 | 14 | 6.02 | 12.01 | 28.46 | 134760 | 6 | 4730 | |
| 3 | 28 | 6.02 | 12.04 | 28.46 | 170550 | 5 | 5990 | 4000 |
| 4 | 28 | 6.00 | 12.01 | 28.27 | 171650 | 3 | 6070 | 4000 |
| 5 | Hold | | | | | | | 4000 |
| Average 28 day compressive strength | | | | | | | | |

Experimental Example 2

A wet pour cementitious blend was prepared using the materials in the Table in Experimental Example 1. The hydrated cementitious blend was poured into molds having the dimensions shown below and cured at air temperature of 81° F. (concrete temperature of 80° F.) to produce a 8 yard batch. The cementitious mixture exhibited a slump of 6. The material exhibited the following compressive strengths:

| Specimen | Age (days) | Dimensions (in) Diameter | Dimensions (in) Height | Area (in²) | Ultimate Load (lbf) | Fracture* | Compressive Strength (psi) | Required Strength (psi) |
| --- | --- | --- | --- | --- | --- | --- | --- | --- |
| 1 | 3 | 6.00 | 12.00 | 28.27 | 76320 | 3 | 2700 | |
| 2 | 7 | 6.01 | 11.99 | 28.37 | 102750 | 5 | 3620 | |
| 3 | 28 | 6.02 | 11.98 | 28.46 | 170250 | 2 | 5980 | 4000 |
| 4 | 28 | 6.03 | 11.94 | 28.56 | 173600 | 2 | 6080 | 4000 |
| 5 | Hold | | | | | | | 4000 |
| Average 28 day compressive strength | | | | | | | 6030 | |

*Fracture is the load measured on a compression machine when a specimen (here a 4 × 8 inch cylinder) ruptures.

Experimental Example 3

A wet pour cementitious blend was prepared using the materials and procedures in Experimental Example 1, with the exception that curing occurred in a water bath at a temperature of 48° F. After 28 days of curing at 48° F., the resulting cementitious composition exhibited a compressive strength of only 2100 psi.

The temperature of the water bath was raised to 113° F. After curing the cementitious composition for an additional 7 days in the water bath at 113° F., the cementitious composition exhibited compressive strength of 4400 psi. After curing the cementitious composition for an additional 3 days in the water bath at 113° F. (for a total of 10 additional days at 113° F.), the cementitious product exhibited a compressive strength of 5050 psi.

Experimental Example 4

A wet pour cementitious blend was prepared using procedures in Experimental Example 1. Using ASTM C109 test procedures for ASTM C989, the following hydrated cementitious blends were tested:

Blend 1: 135 g. water;
    500 g. of the dry cementitious blend of Experimental Example 1;

Blend 2: 135 g. water
    500 g. of a dry cementitious blend comprising:
        88.5 wt. % POZZOSLAG® 1.2 (VHSC);
        8.5 wt. % Portland cement (T3);
        2 wt. % VALFOR®-100 Zeolite NaA; (PQ); and
        1 wt. % VISOCRETE®-225 (SIKA®)

Blend 3: 140 g. water
    500 g. of a dry cementitious blend comprising:
        85.5 wt. % POZZOSLAG® 1.2 (VHSC);
        3 wt. % Quick lime;
        8.5 wt. % Portland cement (T3);
        2 wt. % VALFOR®-100 Zeolite NaA (PQ); and,
        1 wt. % VISOCRETE®-225 (SIKA®)

Blend 4: 152 g. 95% CaCl solution (142 grams of water and 10 g CaCl)
500 g. of a dry cementitious blend comprising:
88.5 wt. % POZZOSLAG® 1.2 (VHSC);
8.5 wt. % Portland cement (T3);
2 wt. % VALFOR®-100 Zeolite NaA (PQ); and,
1 wt. % Visocrete®-225 (SIKA®)

The cementitious composition exhibited the following compressive strengths (psi) after curing at 75° F. or more for the following time periods:

| BLEND: | Compressive Strength (psi) | | |
|---|---|---|---|
| | 3 days (psi) | 14 days (psi) | 28 days (psi) |
| 1 | 1055 | 4580 | 4942 |
| 2 | 273 | 2325 | 2422 |
| 3 | Green | 897 | 1182 |
| 4 | 2320 | 4085 | 5085 |

Better acid resistance generally is exhibited in the cement product at lower calcium contents. However, with one exception (Blend 4) desired 28 day compressive strengths were not produced when 82 wt. % or more of the calcium containing component was replaced by POZZOSLAG® 1.2 (VHSC). Specifically, desired 28 day compressive strengths were not produced by Blend 3 [3 wt. % Quick lime and 85.5 wt. % POZZOSLAG® 1.2 (VHSC)] or Blend 2 [8.5 wt. % Portland cement and 88.5 wt. % POZZOSLAG® 1.2 (VHSC)].

Using liquid calcium chloride (Blend 4) and 88.5 wt. % POZZOSLAG®1.2 (VHSC) increased the compressive strengths to desired levels or greater at all measurements, while not requiring external heat.

Persons of ordinary skill in the art will recognize that many modifications may be made without departing from the spirit and scope of the invention defined by the claims. The embodiment(s) described herein are meant to be illustrative only and should not be taken as limiting the invention, which is defined in the claims.

We claim:

1. A hydrated cementitious blend comprising:
a dry cementitious blend comprising the following, based on the total weight of the dry cementitious blend:
aggregate comprising less than 3 wt. % calcium, selected from the group consisting of rock, sand, or combinations thereof, based on the total weight of the aggregate;
from about 75 wt. % to 82 wt. % pozzolonic material comprising ash comprising particles meeting the ASTM C 989-2010 testing protocol for grade 100 slag quality or higher, the ash being selected from the group consisting of fly ash, calcined or uncalcined volcanic ash, rice hull ash, and combinations thereof;
a catalytically effective quantity of catalyst selected from the group consisting of alkali-containing zeolite, alkali-containing feldspathoid, and combinations thereof; and,
an amount of water reducing component;
the hydrated cementitious blend further comprising an amount of water producing a ratio of water to cementitious blend of from about 0.20 to about 0.30 and a slump of 6 or more;
the hydrated cementitious blend producing a product cement exhibiting a compressive strength of 4000 psi or more after curing for 28 days at 75° F. or more.

2. The hydrated cementitious blend of claim 1 exhibiting a slump of from 8 to 12.

3. The hydrated cementitious blend of claim 2 exhibiting a slump of 10 or less.

4. The hydrated cementitious blend of claim 1 wherein the dry cementitious blend comprises 80 wt. % or less of the pozzolonic material.

5. The hydrated cementitious blend of claim 1 wherein the dry cementitious blend comprises 78 wt. % or less of the pozzolonic material.

6. The hydrated cementitious blend of claim 1 wherein said catalyst is alkali-containing zeolite.

7. The hydrated cementitious blend of claim 5 wherein said catalyst is alkali-containing zeolite.

8. The hydrated cementitious blend of claim 1 wherein:
the water-reducing component is a polycarboxylate water-reducing component; and,
the amount of the polycarboxylate water-reducing component is from about 0.3 wt. % to about 1 wt. %, based on the total weight of the dry cementitious blend.

9. The hydrated cementitious blend of claim 7 wherein:
the water-reducing component is a polycarboxylate water-reducing component; and,
the amount of the polycarboxylate water-reducing component is from about 0.3 wt. % to about 1 wt. %, based on the total weight of the dry cementitious blend.

10. The hydrated cementitious blend of claim 1 wherein the ash is fly ash.

11. The hydrated cementitious blend of claim 9 wherein the ash is fly ash.

12. The hydrated cementitious blend of claim 1 wherein the ash comprises particles meeting the ASTM C 989-2010 testing protocol for grade 120 slag quality or higher.

13. A hydrated cementitious blend comprising:
a dry cementitious blend comprising the following, based on the total weight of the dry cementitious blend:
aggregate comprising less than 3 wt. % calcium selected from the group consisting of rock, sand, or combinations thereof, based on the total weight of the aggregate;
from about 75 wt. % to 82 wt. % pozzolonic material comprising fly ash comprising particles meeting the ASTM C 989-(2010) testing protocol for grade 100 slag quality or higher;
a catalytically effective quantity of catalyst selected from the group consisting of alkali-containing zeolite, alkali-containing feldspathoid, and combinations thereof; and,
an amount of water-reducing component;
the hydrated cementitious blend further comprising an amount of water producing a ratio of water to cementitious blend of from about 0.20 to about 0.30 and a slump of from 6 to 12;
the hydrated cementitious blend producing a product cement exhibiting a compressive strength of 4000 psi or more after curing for 28 days at 75° F. or more.

14. The hydrated cementitious blend of claim 13 exhibiting a slump of from 8 to 12.

15. The hydrated cementitious blend of claim 14 exhibiting a slump of 10 or less.

16. The hydrated cementitious blend of claim 14 wherein the catalyst is sodium zeolite.

17. The hydrated cementitious blend of claim 13 wherein the fly ash is Class F fly ash.

18. The hydrated cementitious blend of claim 15 wherein the fly ash is Class F fly ash.

19. The hydrated cementitious blend of claim 16 wherein the fly ash is Class F fly ash.

20. The hydrated cementitious blend of claim 13 wherein:
the water-reducing component is a polycarboxylate water-reducing component; and,
the amount of the polycarboxylate water-reducing component is from about 0.3 wt. % to about 1 wt. %, based on the total weight of the dry cementitious blend.

21. The hydrated cementitious blend of claim 19 wherein:
the water-reducing component is a polycarboxylate water-reducing component; and,
the amount of the polycarboxylate water-reducing component is from about 0.3 wt. % to about 1 wt. %, based on the total weight of the dry cementitious blend.

22. The hydrated cementitious blend of claim 13 wherein the dry cementitious blend comprises from about 75 wt. % to about 78 wt. % of the pozzolonic material.

23. The hydrated cementitious blend of claim 21 wherein the dry cementitious blend comprises from about 75 wt. % to about 78 wt. % of the pozzolonic material.

24. The hydrated cementitious blend of claim 13 wherein the ash comprises particles meeting the ASTM C 989-2010 testing protocol for grade 120 slag quality or higher.

25. A method comprising:
providing a dry cementitious blend comprising the following, based on the total weight of the dry cementitious blend:
aggregate comprising 3 wt. % or less calcium selected from the group consisting of rock, sand, or combinations thereof, based on the total weight of the aggregate;
from about 75 wt. % to 82 wt. % pozzolonic material comprising ash comprising particles meeting the ASTM C 989-2010 testing protocol for grade 100 slag quality or higher, the ash being selected from the group consisting of fly ash, calcined or uncalcined volcanic ash, rice hull ash, and combinations thereof; and,
catalyst selected from the group consisting of alkali-containing zeolite, alkali-containing feldspathoid, and combinations thereof; and,
an amount of water reducing component;
blending the dry cementitious blend with an amount of water producing a hydrated cementitious blend exhibiting a ratio of water to cementitious blend of from about 0.20 to about 0.30 and a slump of from 6 to 12 inches; and,
curing the hydrated cementitious blend at a temperature of 75° F. or more for 28 hours or more, producing a cementitious product having a compressive strength of 4000 psi or more.

26. The method of claim 25 wherein the blending produces a hydrated cementitious blend exhibiting a slump of from 8 to 10.

27. The method of claim 23 wherein:
the water-reducing component is a polycarboxylate water-reducing component; and,
the amount of the polycarboxylate water-reducing component is from about 0.3 wt. % to about 1 wt. %, based on the total weight of the dry cementitious blend.

28. The method of claim 24 wherein the ash comprises particles meeting the ASTM C 989-2010 testing protocol for grade 120 slag quality or higher.

* * * * *